United States Patent [19]

Young

[11] Patent Number: 4,706,988

[45] Date of Patent: Nov. 17, 1987

[54] PNEUMATIC SPRING SUPPORT SYSTEM

[76] Inventor: Orville R. Young, R.R. 1, Box 60, Horace, N. Dak. 58078

[21] Appl. No.: 928,813

[22] Filed: Nov. 7, 1986

[51] Int. Cl.$^4$ .......................... B60G 5/04; B60G 11/46
[52] U.S. Cl. ...................................... 280/676; 267/31;
280/678; 280/683; 280/712; 280/DIG. 1;
280/6 R
[58] Field of Search ............... 280/676, 677, 678, 682,
280/683, 711, 712, DIG. 1, 680, 686; 180/24.02,
6 R; 267/31

[56] References Cited

U.S. PATENT DOCUMENTS

| | | | |
|---|---|---|---|
| 2,771,303 | 11/1956 | Frazier | 280/682 |
| 2,790,650 | 4/1957 | Boschi | 280/711 |
| 3,014,735 | 12/1961 | Lich | 280/678 |
| 3,224,522 | 12/1965 | Fleming | 180/24.02 |
| 3,233,915 | 2/1966 | Hamlet | 280/712 |
| 3,309,107 | 3/1967 | Chieger | 280/712 |
| 3,499,660 | 3/1970 | Raidel | 280/682 |
| 3,692,325 | 9/1972 | Gouirand | 280/678 |
| 3,762,487 | 10/1973 | Bilas | 180/24.09 |
| 3,799,562 | 3/1974 | Hinchliff | 280/676 |
| 4,009,873 | 3/1977 | Sweet et al. | 280/712 |
| 4,099,740 | 7/1978 | McGee | 280/678 |

Primary Examiner—John J. Love
Assistant Examiner—Kenneth R. Rice
Attorney, Agent, or Firm—Kinney & Lange

[57] ABSTRACT

A spring support system for tandem axles that supports the adjacent ends of the springs which support the front and rear tandem axles in the center and automatically adjusts the level of the trailer as load changes by having inflatable air bags that support a movable cross beam relative to the trailer frame. The spring ends are mounted on the movable cross beam. Air bags are inflated at a pressure that is automatically adjusted to be proportional to the load on the trailer. The air bags provide an air cushion support for smoother and more trouble free operation. The movement is guided adequately so that the support is very stable, by automatically adjusting the stiffness of the pneumatic bags which compensate for differing loads.

5 Claims, 5 Drawing Figures

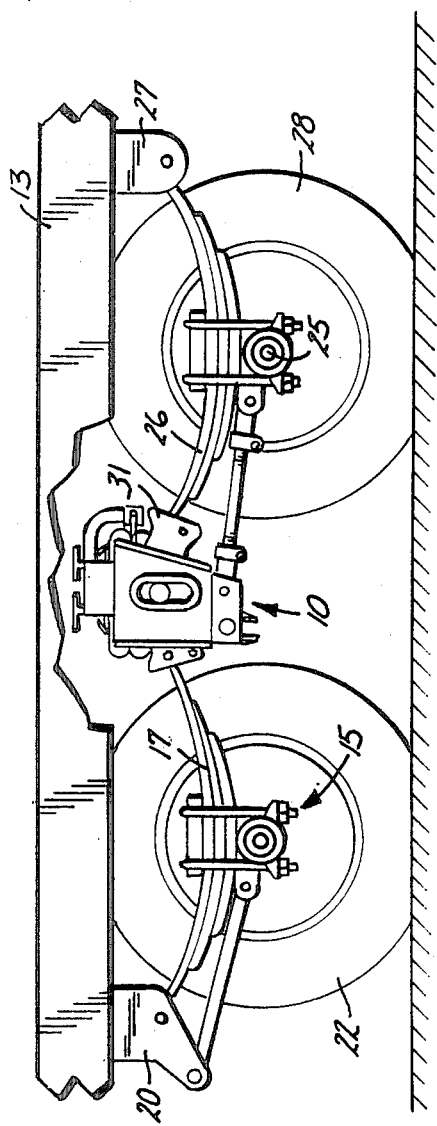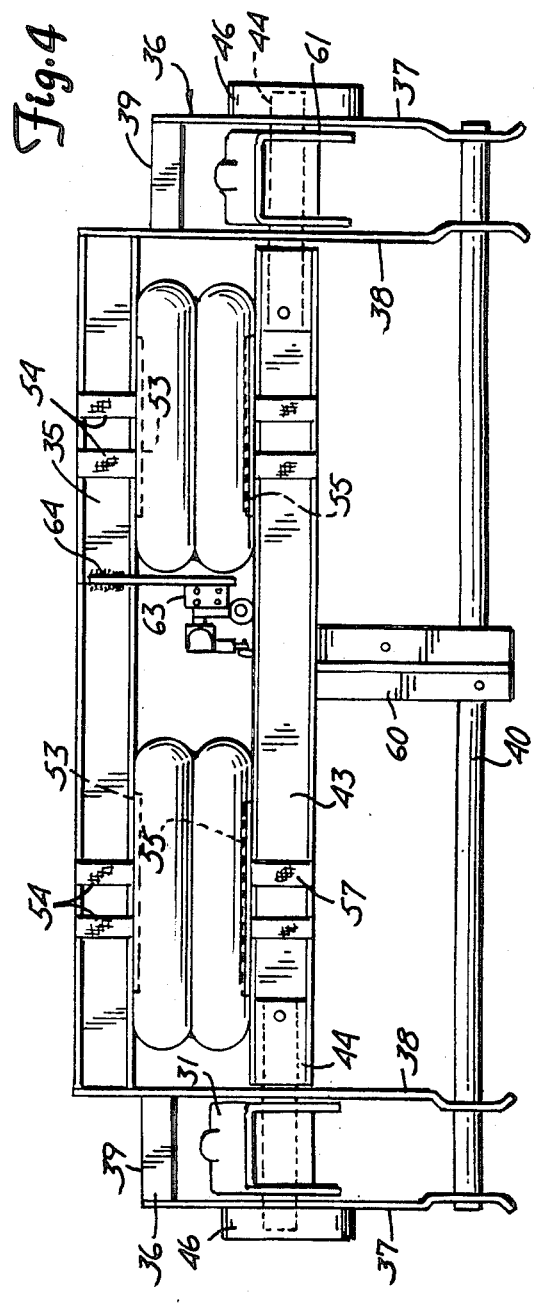

PNEUMATIC SPRING SUPPORT SYSTEM

BACKGROUND OF THE INVENTION

1. Field of the Invention

The present invention relates to vehicle suspensions using pneumatic supports for the intermediate spring shackle mounting member of tandem axle springs.

2. Description of the Prior Art

In the prior art, various air or pneumatic spring suspension units have been advanced. For example, U.S. Pat. No. 2,771,303 issued to Frazier shows a tandem axle arrangement wherein the trailing end of the front suspension spring for the front axle and the leading edge of the suspension springs for the rear axle are connected to housings, each of which is supported directly by an air bag. However, each end of the axles is mounted in a separate bag, requiring smaller sized bags, resulting in higher pressures to withstand high loads used with semi-trailers. However, the individual assembly shows separate inflation for each side of the unit, causing the possibility of problems of uneven support pressures, and also making the device more likely to cause problems.

U.S. Pat. No. 4,099,740 issued to McGee also shows a pneumatic axle support system for tandem axles, which couples the springs used together and places the air bag directly over a coupling member between the rear end of the front spring and the front end of rear spring of a tandem assembly. Here, too, the air bags are at the side edges of the trailer, to support the two ends of the axles independently, providing for problems in control and operation.

Other patents which illustrate the state of the art and utilize air filled bags or cylinders for support of various axles include U.S. Pat. Nos. 2,790,650; 3,014,735; 3,224,522; 3,233,915; 3,309,107; and 3,762,487. These patents are of general interest and show various ways of supporting axles on inflatable members.

SUMMARY OF THE INVENTION

The present invention relates to a pneumatic support for the spring of a tandem axle assembly for a trailer, which uses a rugged cross frame member supported by two pneumatic bags (air bags) which can be of substantial size because they are positioned between the springs on each side, and which act directly between the cross member and a vertically movable member called a cross beam that carries the spring equalizer shackle for supporting the rear of the front springs and the front of the rear springs of the tandem axle assembly. The cross frame is controlled as to position and pressure by a mechanical linkage operating a valve, so that as the trailer is loaded, and the trailer tends to settle, the air bags will collapse, causing the valve to be actuated to increase the pressure and restore proper level position to the trailer being supported on the suspension system. The opposite movement occurs when the trailer is unloaded.

The movable cross-beam is mounted on bearings to minimize wear, and is guided so that there is no distortion under load that will affect operation.

The enhanced ride reduces the likelihood of load damage, and increases the efficiency of the spring system.

BRIEF DESCRIPTION OF THE DRAWINGS

FIG. 2 is a side view of the device of FIG. 1;

FIG. 4 is a rear view of the axle assembly of FIG. 3; and

DETAILED DESCRIPTION OF THE PREFERRED EMBODIMENTS

Figure 1:
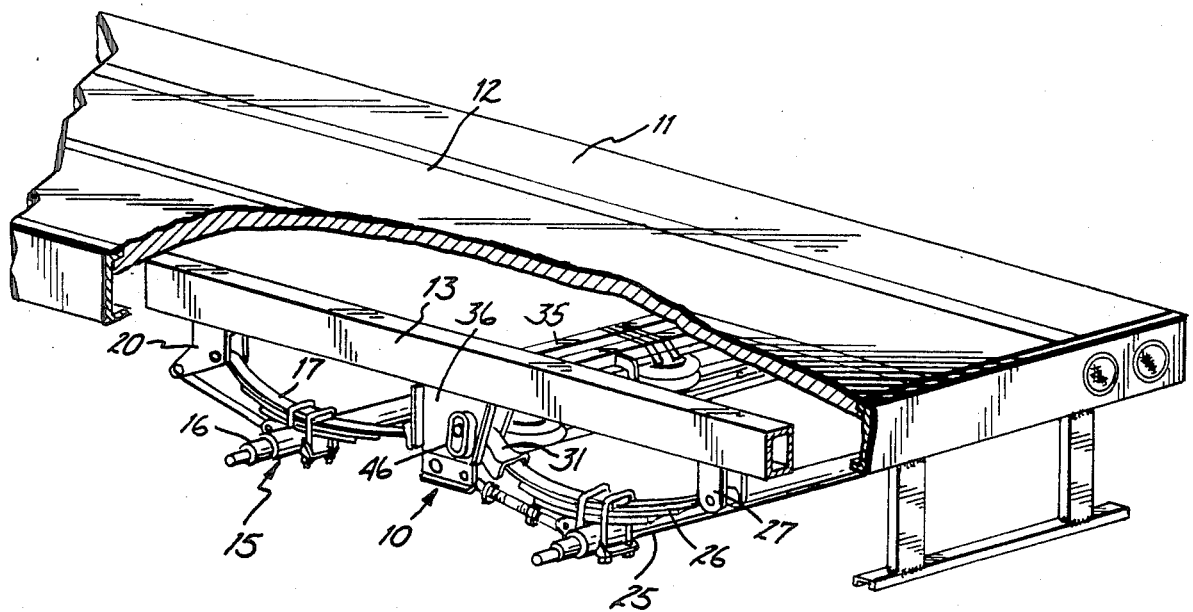
FIG. 1 is a perspective view of a typical trailer having an axle assembly having spring supports made according to the present invention installed thereon.

Referring to FIG. 1, a pneumatically coupled spring support assembly made according to the present invention is indicated generally at 10 and as shown, it is used in connection with a trailer 11 as shown having a flat bed 12, (although any type of trailer can be used) and longitudinally extending frame stringers 13 for supporting the trailer. A tandem axle assembly indicated generally at 15, as shown, includes a front or forward axle 16 mounted onto springs 17 (one on each side of the trailer) that have front ends connected to a spring shackle 20 that is connected onto a frame stringer 13 (there are frame stringers 13 on both sides of the trailer) and the spring is coupled to the axle 16 in a normal manner. The axle 16 rotatably supports dual wheels as shown in FIG. 2 schematically. These wheels are indicated at 22 for the front axle assembly.

A rear axle 25 of the tandem axle assembly 15 is mounted onto a pair of rear springs 26 (one on each side) that have their rear ends mounted onto spring shackles 27 that are supported onto the respective frame stringer 13. The axle 25 also supports wheels shown generally at 28, in FIG. 2.

The front ends of each spring 26 and the rear ends of each spring 17 are carried on the support assembly 10 made according to the present invention, and as shown, on each side of the trailer, a load equalizer member 31 supports the front end of the respective spring 26 near the rear of the equalizer, and supports the rear end of the spring 17 at the front end of the equalizer. The equalizer member 31 forms a part of the axle assembly 10, as will be explained.

Figure 3:
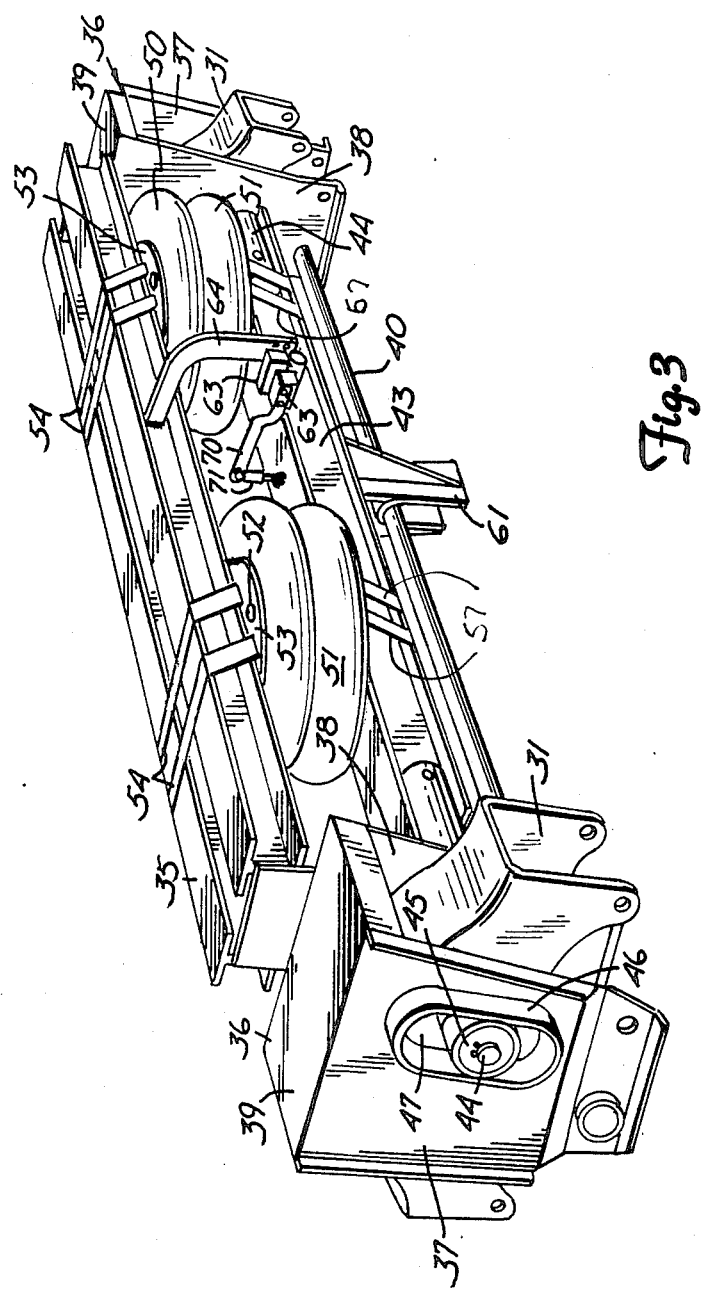
FIG. 3 is an enlarged perspective view of the axle assembly of FIG. 1 with parts removed for sake of clarity.

Referring specifically to FIGS. 2, 3 and 4, the axle assembly includes a pair of parallel, main cross-mounting beams 35 which are coupled directly to the trailer, and provide the support to the trailer. The mounting beams 35 in turn have spring hangers 36,36 fixedly mounted at opposite ends thereof. The spring hangers 36 are inverted U-shaped members that have side plates 37 and 38, and a top member 39. The equalizer members 31 slidably mount inside the spring hangers between the side plates 37 and 38.

The spring hanger plates 37 and 38 on each side are fixed to a cross-support tube 40 that also extends between the spring hangers 36 to hold them securely. The tube 40 is spaced below the cross mounting beams 35 a substantial distance, to provide space for vertical movement of the movable portion of the axle assembly, comprising a movable cross beam 43 which is positioned between the hangers 36,36. Stub axles or stub shafts 44 are mounted at opposite ends of the cross beam 43. The stub shafts 44 in turn each pass through slots in the inner plates 38 of the spring hangers 36, and across the opening defined between plates 37 and 38. As shown, the outer ends of the stub shafts 44 each have a heavy duty roller bearing 45 mounted at the outer end thereof and these roller bearings 45 are guided in bearing tracks or flanges 46 that are on the outside of the outer plates 37 of the hangers 36. The plates 37 have slots 47 in which the stub shafts or axles 44 can move vertically, and the guides or tracks 46 guide the movement of these stub shafts, and thus guide the movement of the cross beam 43. Cross beam 43 is an I-beam for rigidity.

The spring equalizer members 31 are mounted onto the stub shafts 44, and can pivot thereon on suitable support bushings to provide equalization of loading between the corresponding front and rear springs 17 and 26.

The slots 47 are of substantial vertical height to permit the beam 43 and the stub shafts 44 to move up and down. The height of the cross mounting beams 35 relative to the movable cross beam 43, and thus the height of the trailer is controlled by the use of air bag assemblies indicated generally at 50 to form pneumatic bellows, that can be inflated to provide an air cushion. The air bag assemblies 50 as shown are elastomeric material made up of two ring type members comprising a pneumatic bag 51, that is enclosed except for an air inlet valve or fitting that is shown schematically at 52. The fitting 52 extends through a support disc 53 that is of adequate diameter to provide the needed support to the center portions of the pneumatic bags 51, and is supported on the cross mounting beams 35. Suitable braces 54 are provided for bracing the discs 53 back to the cross mounting beams 35.

Second lower discs 55 of suitable diameter very similar to the upper discs 53 are mounted onto the cross beam 43, as shown in FIG. 4, and are braced to the cross beam 43 with suitable braces 57. The air bags 51 are thus positioned between the main cross mounting beams 35 and the movable cross beam 43, which has the stub shafts or axles 44 at the outer ends suitably fastened in place.

The amount of spacing between the movable cross beam 43 and the cross mounting beams 35 determines the relative position of the stub axles 44, and thus the wheels relative to the trailer. By regulating the pressure in the air bags 51, the spacing between the cross beams can be controlled, and by regulating the pressure in such bags, the amount of load capable of being carried by the bags also can be changed.

In order to provide stability for the cross beam 43, a guide bracket 60 is provided on the lower side of the movable cross beam 43 and it has a slot 61 lined with suitable low friction material such as Teflon to ride against the cross tube 40 and in this way it stabilizes the movable cross beam 43 from tending to tilt so that the movable cross beam 43 can move up and down but does not tend to rotate. Also, suitable wear pads indicated generally at 61 can be provided between the side plates 37 and 38 of each of the hangers 36, and side plates of the equalizer members 31, as shown in FIG. 4.

Figure 5:
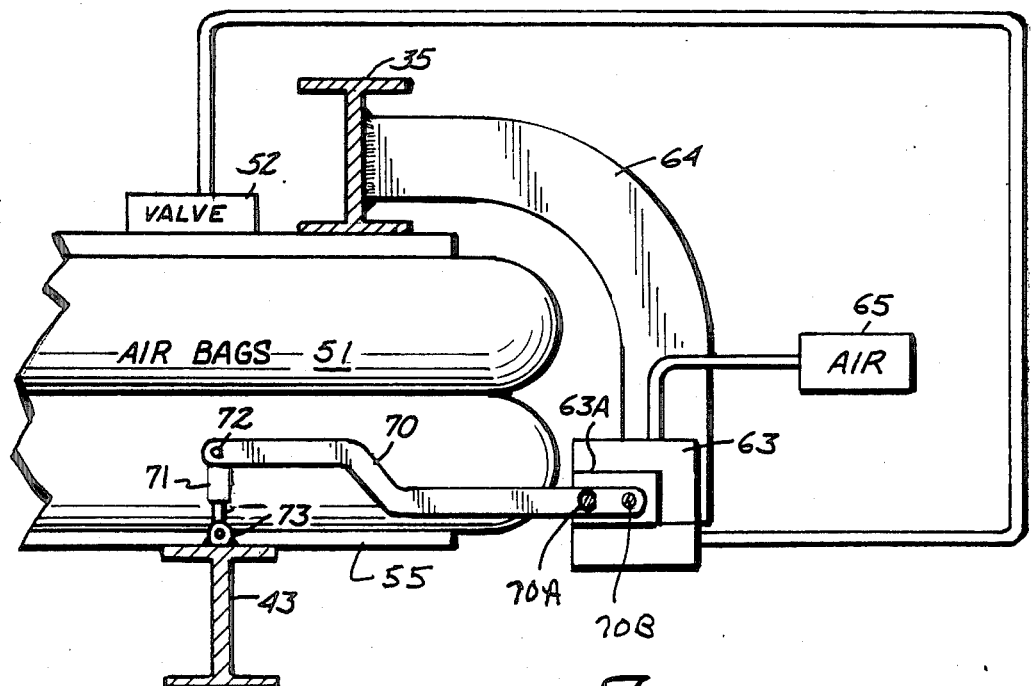
FIG. 5 is a side elevational view showing a mounting for a control valve used with the present invention.

The pressure control to the air bags 51 is controlled by a suitable valve 63 which is mounted onto a bracket 64 that is fixed to the cross mounting beams 35, and thus the valve 63 is anchored relative to the trailer itself. The valve 63 is a purchased valve that may have a built-in time delay section so that the valve will not open to provide air from a pressure source 65, to its outlet line shown schematically at 66 in FIG. 5 until a predetermined time delay has occured after the valve actuator has moved. A time delay is not needed, but can be used.

The actuator of the valve 63 is a rotary or rotating actuator 63A, and an actuating lever 70 is provided to the actuator and extends forwardly from the valve 63. The actuating lever 70 overlies the movable cross beam 43, and is connected thereto with a link 71 that is pivotally mounted as at 72 to the actuator lever 70, and is also mounted as at 73 with respect to the movable cross beam 43. The lever 70 has a slightly slotted opening for a mounting bolt 70A that clamps the lever to actuator 63. The lever 70 can be adjusted about a pivot pin 70B on the actuator to set the valve at a zero position when the stub axles or shafts 44 are substantially centered vertically in the slots 47 and the guides 46.

The link 71 carries both tension and compression, so that movement of the movable beam 43 relative to the cross mounting beams 35, as for example when more load is placed on the trailer, will be sensed by the position change of the link 71 and lever 70. When the actuating lever 70 has moved a sufficient distance, the valve 63 will open (after a time delay if one is provided) and admit air under pressure from the source 65 to the air bags 51 through the fitting 52. This will increase the pressure in the air bags 51 and restore the original positioning of the movable cross beam 43 relative to the cross mounting beams 35 to come back to its zero or reference position. The pressure source 65 is normally the air supply used for brakes on semi trailers.

This operation will be reversed when load is removed from the trailer, and the trailer will then rise because of the pressure in air bags 51. This will cause the link 71 to be under tension, moving the lever 70 in a different direction relative to the valve and when actuator 63A has operated, the valve 63 will open to permit air to escape from air bags 51, and restore the trailer to is equilibrium position.

The operation of the valve 63 is in response to movement of the position of the trailer and restores an equilibrium position as the trailer is loaded or unloaded. The actuator valve operation lets the trailer operate at a level and reference location under a suitable pressure for the load that is present, and the load is thus supported pneumatically for a smooth ride.

The assembly is very sturdy because the two air bags 51,51 can be spaced apart, but positioned within the trailer width between the hangers 36, so the bags can be quite large, requiring lower pressure for operation. The pressure is easily controllable for operation. The spacing of the air bags between cross mounting beams 35 and a single movable cross beam 43 enhances the stability from side to side, and keeps the two sides of the trailer level. Additionally, the stability is increased by using the guide 61 with the reinforcing or brace tube 40. The air bags are pneumatically connected in parallel for operation.

A further feature is the fact that large bearings 45 can be used on the ends of the stub shafts or axles 44 for reducing wear because of vertical movements during operation, and to ensure that nothing will stick or freeze up.

Although the present invention has been described with reference to preferred embodiments, workers skilled in the art will recognize that changes may be made in form and detail without departing from the spirit and scope of the invention.

What is claimed is:

1. A support for the center spring ends of a tandem axle assembly comprising:

a mounting cross beam adapted to support a portion of a vehicle and adapted to be fixed relative to the vehicle, a pair of tandem axle spring hangers fixed at opposite ends of said mounting cross beam and thus fixed with respect to the vehicle;

a movable cross beam positioned between said tandem axle spring hangers, said movable cross beam having portions extending through provided slots in said tandem axle spring hangers, means mounted on said portions in said tandem axle spring hangers for mounting tandem axle springs at opposite ends thereof;

a cross tube extending between the lower ends of said tandem axle spring hangers reinforcing said spring hangers and being spaced below the movable cross beam;

controllable air bag means operable between said movable cross beam and said mounting cross beam, said air bag means comprising a pair of air bags that are between the tandem axle spring hangers and with each one adjacent to one of the tandem axle spring hangers, the air pressure to the air bags, and thus the vehicle height, being controlled by means of a pneumatic circuit connected to the airbags in parallel; and valve means to sense the position of said movable cross beam relative to said mounting cross beam for providing controllable pressure to each of the air bags to optimize the height of the vehicle in response to the load.

2. A support for the center spring ends of a tandem axle assembly comprising:

a mounting cross beam adapted to support a portion of a vehicle and adapted to be fixed relative to the vehicle, a pair of tandem axle spring hangers fixed at opposite ends of said mounting cross beam and thus fixed with respect to the vehicle;

a movable cross beam positioned between said tandem axle spring hangers, said movable cross beam having portions extending through provided slots in said tandem axle spring hangers, means mounted on said portions in said tandem axle spring hangers for mounting tandem axle springs at opposite ends thereof;

a cross tube extending between the lower ends of said tandem axle spring hangers reinforcing said spring hangers and being spaced below the movable cross beam;

controllable air bag means operable between said movable cross beam and said mounting cross beam, said air bag means comprising a pair of air bags that are between the tandem axle spring hangers and with each one adjacent to one of the tandem axle spring hangers, the air pressure to the air bags, and thus the vehicle height, being controlled by means of a pneumatic circuit connected in parallel;

valve means to sense the position of said movable cross beam relative to said mounting cross beam for providing controllable pressure to each of the air bags to optimize the height of the vehicle in response to the load; and a guide fixed to the movable cross beam that fits around the cross tube and stabilizes said movable cross beam during its vertical movement.

3. The apparatus as specified in claim 1 wherein said movable cross beam has stub shafts at its ends, said stub shafts moving in said tandem axle spring hangers, said tandem axle spring hangers each having inner and outer walls that are spaced apart and the stub shafts spanning the inner and outer walls, the outer ends of said stub shafts being mounted in the outer walls of the tandem axle spring hangers, respectively, a track fixed to each of the outer walls of each of the spring hangers and having surfaces that are parallel to the direction of movement of said stub shafts when the spacing between the movable cross beam and the cross mounting beam changes, and bearing means mounted on said stub shafts and adapted to engage the surfaces of the tracks for guiding the stub shafts during movement relative to the spring hangers.

4. The apparatus of claim 1 wherein said dual air bag and tandem axle spring support includes spring equalizer members slidably mounted in each of said hangers, said spring equalizer members having means for mounting ends of springs for a tandem axle at opposite ends of the spring hangers, and low friction means for slidably guiding said equalizer members relative to said hangers to control equalizaton of the load between the tandem axles as well as optimization of the vehicle height.

5. A vertically movable, controllable position support for the center spring ends of a tandem axle assembly comprising:

a mounting cross beam adapted to support a portion of a vehicle and adapted to be fixed relative to such vehicle;

a pair of guide members fixed at opposite ends of said mounting cross beam and thus fixed with respect to the vehicle, said guide members each having spaced side guide walls with substantially vertical slots therein;

a movable cross beam positioned between said guide members, said mobable cross beam having end portions extending through the slots in the side walls;

spring support means mounted on each of said end portions of the cross beam and positioned between the side walls of each of the respective guide member, said spring support means each having fore and aft ends adapted to support the rear end of a first spring and the front end of a second spring for a tandem axle assembly, respectively;

air bag means operably mounted between said movable cross beam and said mounting cross beam, said air bag means comprising a pair of air bags that are positioned between the guide members and with each bag adjacent one of the guide members; and valve means to sense the position of said movable cross beam relative to said mounting cross beam for providing fluid under pressure to each of the air bags to control the height of the spring support means relative to the mounting cross beam in response to load.

* * * * *